US008282885B2

(12) United States Patent
Palmas et al.

(10) Patent No.: US 8,282,885 B2
(45) Date of Patent: Oct. 9, 2012

(54) RECESSED GAS FEED DISTRIBUTOR APPARATUS FOR FCC RISER

(75) Inventors: Paolo Palmas, Des Plaines, IL (US); Paul S. Nishimura, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 164 days.

(21) Appl. No.: 12/826,404

(22) Filed: Jun. 29, 2010

(65) Prior Publication Data
US 2011/0318235 A1 Dec. 29, 2011

(51) Int. Cl.
*B01J 8/18* (2006.01)
*F27B 15/00* (2006.01)
*F27B 15/08* (2006.01)
*F27B 15/14* (2006.01)
*F27B 15/16* (2006.01)
*B01J 19/00* (2006.01)
*B01F 3/04* (2006.01)
*B01F 5/04* (2006.01)

(52) U.S. Cl. ........ 422/139; 422/129; 422/140; 422/141; 422/142; 422/143; 422/144; 422/145; 422/146; 422/147; 261/75; 261/76; 261/115

(58) Field of Classification Search .......... 422/129, 422/139–147; 261/19, 75, 76, 78.1, 115
See application file for complete search history.

(56) References Cited

U.S. PATENT DOCUMENTS

| | | | |
|---|---|---|---|
| 2,786,801 A | 4/1952 | McKinley et al. | |
| 3,844,973 A | 10/1974 | Stine et al. | |
| 3,919,115 A | 11/1975 | Stine et al. | |
| 3,923,686 A | 12/1975 | Stine et al. | |
| 4,713,169 A | 12/1987 | Nielsen | |
| 4,793,913 A | 12/1988 | Chessmore et al. | |
| 4,808,383 A | 2/1989 | Buyan et al. | |
| 5,009,769 A | 4/1991 | Goelzer | |
| 5,139,748 A | 8/1992 | Lomas et al. | |
| 5,156,817 A | 10/1992 | Luckenbach | |
| 6,146,519 A | 11/2000 | Koves | |
| 6,558,530 B2 | 5/2003 | Schlosser et al. | |
| 6,613,290 B1 * | 9/2003 | Senior | 422/140 |
| 6,627,161 B1 * | 9/2003 | Radcliffe et al. | 422/139 |
| 7,026,262 B1 | 4/2006 | Palmas et al. | |
| 7,601,304 B1 | 10/2009 | Palmas et al. | |
| 8,092,755 B2 * | 1/2012 | Castagnos et al. | 422/220 |
| 2007/0205139 A1 | 9/2007 | Kulprathipanja et al. | |
| 2008/0035526 A1 | 2/2008 | Hedrick et al. | |
| 2008/0081006 A1 | 4/2008 | Myers et al. | |
| 2010/0078357 A1 | 4/2010 | Couch et al. | |
| 2010/0080741 A1 | 4/2010 | Couch et al. | |
| 2010/0150788 A1 | 6/2010 | Palmas et al. | |
| 2011/0315602 A1 * | 12/2011 | Palmas et al. | 208/113 |

OTHER PUBLICATIONS

U.S. Appl. No. 12/826,380, filed Jun. 29, 2010, Palmas et al.

* cited by examiner

*Primary Examiner* — Walter D Griffin
*Assistant Examiner* — Natasha Young
(74) *Attorney, Agent, or Firm* — James C Paschall

(57) ABSTRACT

An FCC apparatus may include a distributor disposed in a recess in a wall of the riser for distributing gaseous hydrocarbon feed to a riser. The distributor may be shielded from upwardly flowing catalyst by a shield. An array of nozzles from the distributor may extend through openings in the shield.

17 Claims, 5 Drawing Sheets

RECESSED GAS FEED DISTRIBUTOR APPARATUS FOR FCC RISER

BACKGROUND OF THE INVENTION

This invention relates generally to an apparatus for fluid catalytic cracking of hydrocarbons.

DESCRIPTION OF THE PRIOR ART

Fluid catalytic cracking (FCC) is a catalytic conversion process for cracking heavy hydrocarbons into lighter hydrocarbons by bringing the heavy hydrocarbons into contact with a catalyst composed of finely divided particulate material in a fluidized reaction zone. Most FCC units use zeolite-containing catalyst having high activity and selectivity. As the cracking reaction proceeds, substantial amounts of highly carbonaceous material, referred to as coke, are deposited on the catalyst, forming spent catalyst. Spent catalyst is continually removed from the reaction zone to a regeneration zone. High temperature regeneration burns the coke from the spent catalyst. The hot regenerated catalyst is returned to the reaction zone to contact the hydrocarbon feed with sufficient heat content to support the endothermic catalytic cracking reaction.

FCC can create a variety of products from heavier hydrocarbons. Often, a feed of heavier hydrocarbons, such as a vacuum gas oil, is provided to an FCC reactor. Various products may be produced, including a gasoline product and/or light olefins, such as at least one of propylene and ethylene. To produce more light olefins, product cuts from FCC product, such as naphtha, may be recycled to the riser reactor or to an additional riser reactor for additional catalytic cracking.

It may be desirable to feed these recycled product cuts to a riser in a gaseous phase.

It may be desirable to provide a distributor for distributing gaseous hydrocarbon feed to an FCC reactor.

SUMMARY OF THE INVENTION

We have discovered a distributor for feeding gaseous hydrocarbon to an FCC riser.

In an apparatus embodiment, the invention comprises a hydrocarbon feed distributor for fluid catalytic cracking apparatus. The hydrocarbon feed distributor comprise a hydrocarbon feed pipe. A tubular header is connective with the hydrocarbon feed pipe. The header has a round longitudinal axis. An array of nozzles extends from the header and are in communication with said hydrocarbon feed pipe.

In an additional apparatus embodiment, the invention comprises a fluid catalytic cracking apparatus. The apparatus comprises a riser having a wall. A recess in the wall surrounds the riser. Lastly, a feed distributor is disposed in the recess. In a further apparatus embodiment, the distributor comprises a tubular header having a round longitudinal axis, and an array of nozzles extending from the header.

DETAILED DESCRIPTION

This invention relates generally to an improved FCC apparatus. Specifically, this invention may relate to an improved feed distributor and may be useful for FCC operation to spray vaporized feed into a reactor riser.

Figure 1:
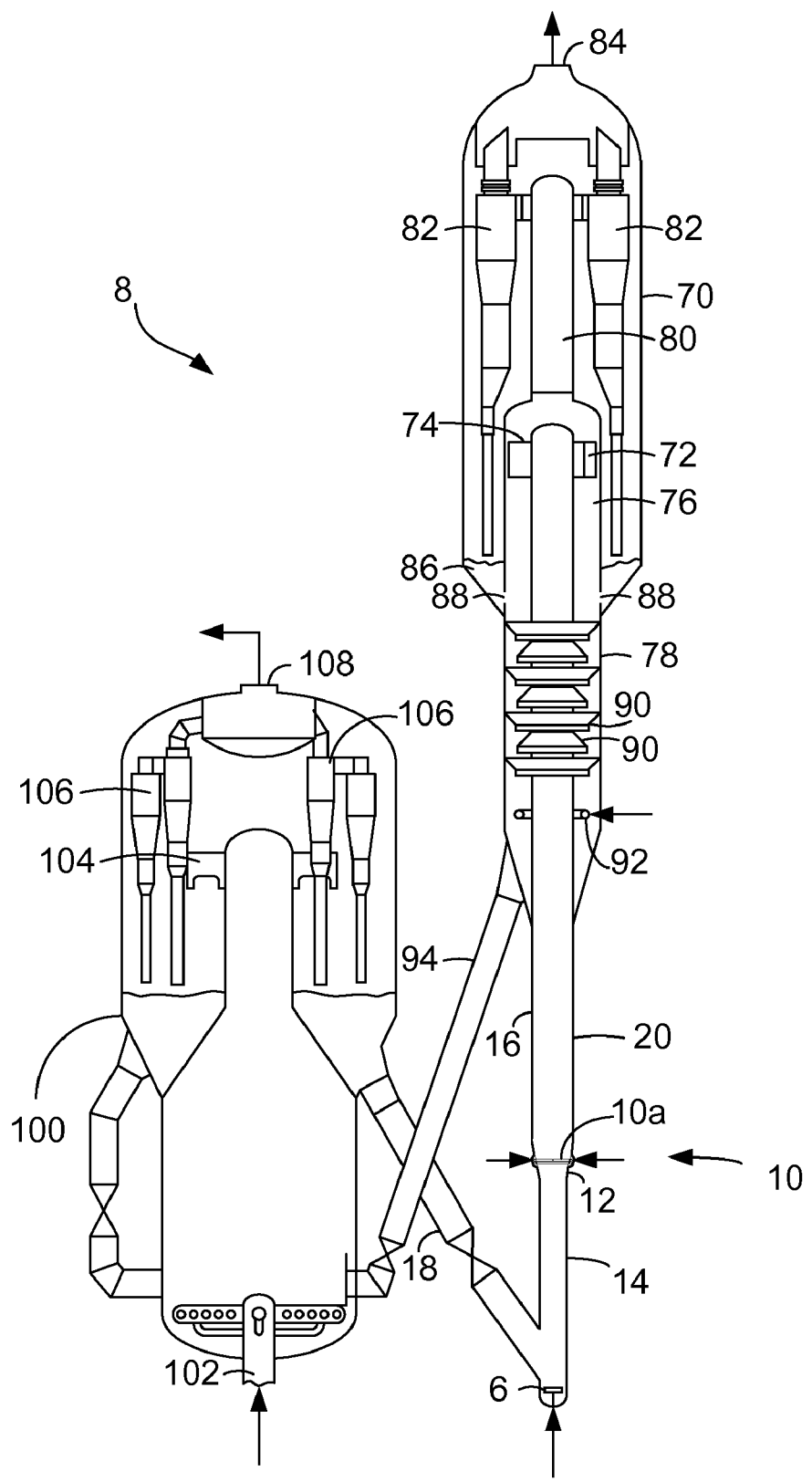
FIG. 1 is an elevational schematic showing an FCC unit.

As shown in FIG. 1, an FCC unit 8 may be used in the FCC process. Hydrocarbon feedstock may be sprayed by a distributor arrangement 10 into a riser 20 where it contacts catalyst. In general, feedstock may be cracked in the riser 20 in the presence of catalyst to form a cracked product stream.

A conventional FCC feedstock is a suitable feed to the riser 20. The most common of such conventional feedstocks is a "vacuum gas oil" (VGO), which is typically a hydrocarbon material having a boiling range of from 343° to 552° C. (650° to 1025° F.) prepared by vacuum fractionation of atmospheric residue. Heavier hydrocarbon feedstocks may also be used in the present invention. Conventional FCC feedstock may be vaporized and sprayed in the riser by the distributor arrangement 10. In an aspect, a stream such as a naphtha stream, perhaps from an FCC product cut, may be vaporized and sprayed into the riser 20 by distributor arrangement 10. An FCC product cut is obtained from an FCC product effluent which is separated into a variety of product cuts by absorption and/or fractionation. An FCC product cut may be recycled to a riser from which it was produced or sprayed into a separate, dedicated riser. If an FCC product cut is recycled to a riser, conventional hydrocarbon feed may be injected into the riser 20 by an additional conventional distributor, typically in a lower section 14 of the riser below distributor arrangement 10 which distributes the FCC product cut to the riser. The additional conventional distributor may be located in an additional swaged section (not shown) of the riser.

As shown in FIG. 1, the distributor arrangement 10 is located at a swaged section 12 of the riser between the lower section 14 of the riser having a relatively smaller inner diameter and a upper section 16 of the riser having a relatively larger inner diameter than the lower section 14. The swage section 12 has an increasing diameter from bottom to top which transitions between smaller diameter, lower section 14 and larger diameter, upper section 16. Regenerated catalyst is delivered to the riser 20 from regenerator standpipe 18. In an embodiment, lift gas which may include inert gas such as steam may be distributed by lift gas distributor 6 to lift catalyst upwardly from the lower section 14 of the riser 20. Alternatively, the distributor arrangement 10 may be situated lower in the riser 20 and provide gas for lifting which may obviate a separate lift gas distributor. Vaporous feed sprayed from a distributor 10a in the distributor arrangement 10 contacts lifted, fluidized catalyst in the swaged section 12 and moves upwardly in the riser 20 into the upper section 16 as the hydrocarbon feed cracks to smaller hydrocarbon cracked products. The cracked products and spent catalyst enter the reactor vessel 70 and are then discharged from the top of the riser 20 through the riser outlet 72 and separated into a cracked product vapor stream and a collection of catalyst particles covered with substantial quantities of coke and generally referred to as spent catalyst. A swirl arm arrangement 74, provided at the end of the riser 20, may further enhance initial catalyst and cracked hydrocarbon separation by imparting a tangential velocity to the exiting catalyst and cracked product vapor stream mixture. The swirl arm arrangement 74 is located in an upper portion of a separation chamber 76, and a stripping zone 78 is situated in the lower portion of the separation chamber 76. Catalyst separated by the swirl arm arrangement 74 drops down into the stripping zone 78.

The cracked product vapor stream comprising cracked hydrocarbons including naphtha, light olefins and some catalyst may exit the separation chamber 76 via a gas conduit 80 in communication with cyclones 82. The cyclones 82 may remove remaining catalyst particles from the product vapor stream to reduce particle concentrations to very low levels. The product vapor stream may exit the top of the reactor vessel 70 through a product outlet 84. Catalyst separated by the cyclones 82 returns to the reactor vessel 70 through diplegs into a dense bed 86 where catalyst will pass through chamber openings 88 and enter the stripping zone 78. The stripping zone 78 removes adsorbed and entrained hydrocarbons from the catalyst by counter-current contact with inert gas such as steam over the optional baffles 90. Steam may enter the stripping zone 78 through a distributor 92. A spent catalyst conduit 94 transfers coked catalyst, regulated by a control valve, to a regenerator 100. Additionally, a spent catalyst recycle conduit (not shown) may transfer some spent catalyst back to the riser 20 below the feed distributor arrangement 10 without undergoing regeneration.

As shown in FIG. 1, the regenerator 100 receives the coked catalyst and typically combusts the coke from the surface of the catalyst particles by contact with an oxygen-containing gas. The oxygen-containing gas enters the bottom of the regenerator 100 via a regenerator distributor 102. Flue gas passes upwardly through the regenerator 100. A primary separator, such as a tee disengager 104, initially separates catalyst from flue gas. Regenerator cyclones 106, or other means, remove entrained catalyst particles from the rising flue gas before the flue gas exits the vessel through an outlet 108. Combustion of coke from the catalyst particles raises the temperatures of the catalyst. The catalyst may pass, regulated by a control valve, through a regenerator standpipe 18 which communicates with the lower section 14 of the riser 20.

Regenerated catalyst from the regenerator standpipe 18 will usually have a temperature in a range from about 649° and about 760° C. (1200° to 1400° F.). If air is used as the oxygen-containing gas, the dry air rate to the regenerator may be between about 8 and about 15 kg/kg coke. The hydrogen in coke may be between about 4 and about 8 wt-%, and the sulfur in coke may be between about 0.6 and about 3.0 wt-%. Catalyst coolers on the regenerator may be used. Additionally, the regenerator 100 may be operated under partial CO combustion conditions.

The zeolitic molecular sieves used in typical FCC operation have a large average pore size and are suitable for the present invention. Molecular sieves with a large pore size have pores with openings of greater than 0.7 nm in effective diameter defined by greater than 10 and typically 12 membered rings. Suitable large pore molecular sieves include synthetic zeolites such as X-type and Y-type zeolites, mordenite and faujasite. Y-type zeolites with low rare earth content are preferred. Low rare earth content denotes less than or equal to about 1.0 wt-% rare earth oxide on the zeolitic portion of the catalyst. Catalyst additives may be added to the catalyst composition during operation. Medium pore sized molecular sieves such as MFI with openings of 0.7 nm or less may be blended in with the large pore molecular sieves to increase production of lighter olefins. In some cases, only medium pore sized molecular sieves may be used if the feed to the riser is an FCC product cut such as a naphtha stream.

The riser 20 may operate with catalyst-to-oil ratio of between about 4 and about 12, preferably between about 4 and about 10. Inert gas to the riser 20 may be between about 1 and about 15 wt-% of hydrocarbon feed, preferably between about 4 and about 12 wt-%. Before contacting the catalyst, the hydrocarbon feed may have a temperature in a range of from about 149° to about 427° C. (300 to 800° F.), preferably between about 204° and about 288° C. (400° and 550° F.). If vaporous naphtha is the feed, the temperature will be between 30 and 370° C. (86 and 700° F.). If vaporous VGO is the feed, the temperature of the hydrocarbon feed will be above about 427° C. (800° F.).

The riser 20 may operate in a temperature range of between about 427° and 649° C. (800° and 1200° F.), preferably between about 482° and about 593° C. (900° and 1100° F.). The pressure in the riser 20 may be between about 69 and about 241 kPa (gauge) (10 and 35 psig), preferably at about 103 kPa (gauge) (15 psig).

The feed pressure drop across the feed distributor arrangement 10 may be between about 69 and about 690 kPa (gauge) (10 and 100 psig), preferably between about 205 and about 415 kPa (gauge) (30 and 60 psig). The inert gas on hydrocarbon feed from the distributor may be between about 0 and about 7 wt-%, and preferably between about 1 and 6 wt-%.

Figure 2:
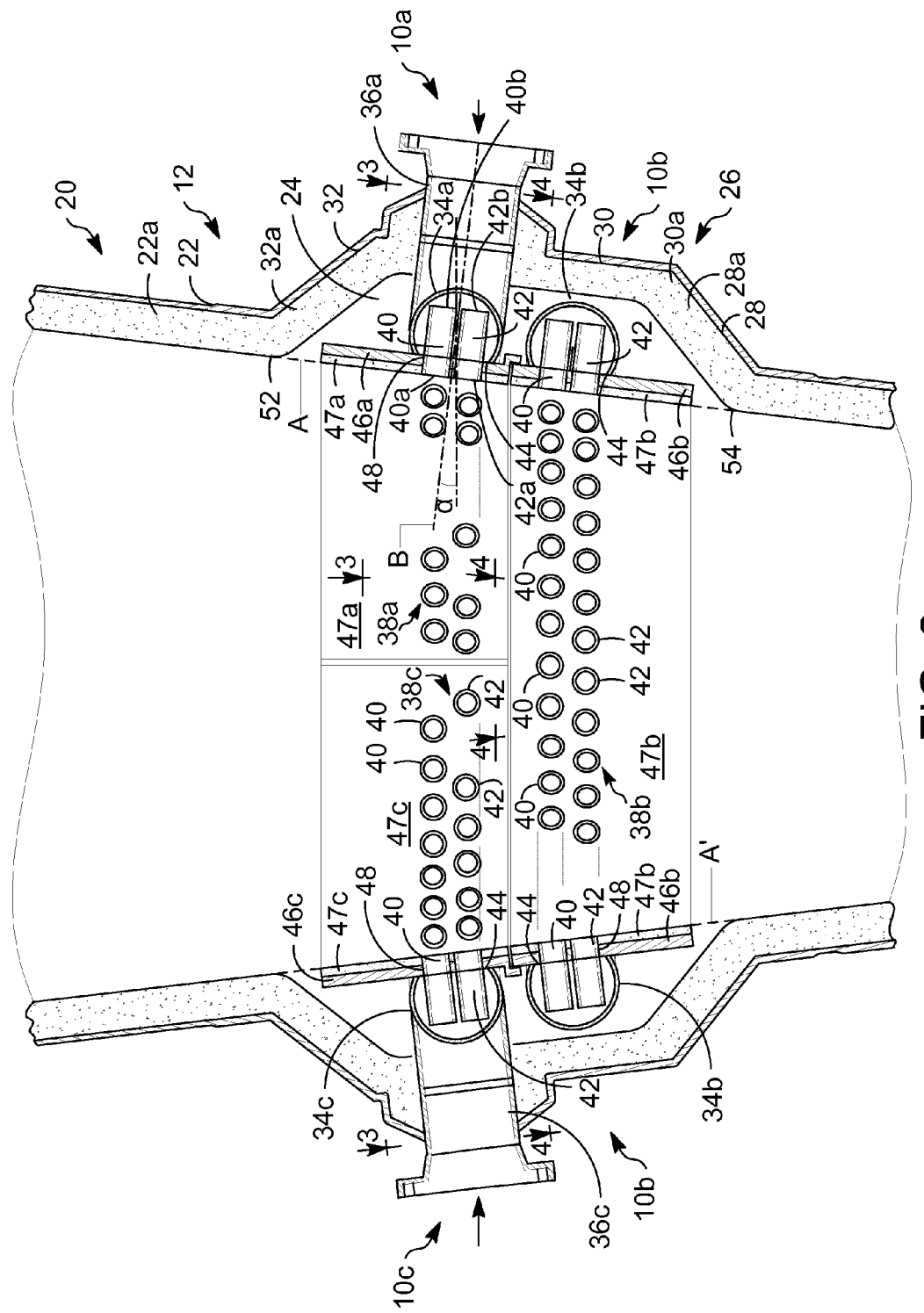
FIG. 2 is an enlarged cross-sectional view taken of the distributor arrangement of FIG. 1.

FIG. 2 is an enlarged partial elevational view of the feed distributor arrangement 10. The riser 20 includes a wall 22 that may define a swaged section 12. The wall 22 may be coated with a refractory lining 22*a*. The wall 22 is considered to include the refractory lining 22*a*. The wall 22 is made of appropriate metal, typically steel; whereas, the lining 22*a* may be made of a concrete anchored to the wall 22. The riser 20 includes a recess 24 in the wall 22 that surrounds the riser. In an embodiment, the recess 24 encircles the entire circumference of the riser 20. The recess 24 may be defined by a convex bulge 26 in the wall 22, so that the inner diameter of the riser 20 increases in the recess. In an embodiment, the recess may have a trapezoidal vertical cross section. The trapezoidal vertical cross section may include a lower diagonal side 28, a vertical or slightly vertical, upright side 30 and an upper diagonal side 32. Corresponding refractory linings 28*a*, 30*a* and 32*a*, respectively, are disposed on lower diagonal side 28, upright side 30 and upper diagonal side 32, respectively. The convex bulge may be located in the swage section 12 of the riser 20, so the upright side 30 may be slightly angled from vertical and have the same slope as the swage section 12. The feed distributor arrangement 10 is disposed in the recess 24 to protect it from upflowing catalyst. The recess may be filled Kaowool or other material to prevent catalyst infiltration.

The distributor arrangement 10 includes a first distribution device 10*a* comprising a tubular header 34*a* connective with a hydrocarbon feed pipe 36*a*. The tubular header 34*a* is in downstream communication with the hydrocarbon feed pipe 36*a*. The hydrocarbon feed pipe may be the only feed pipe connective with the header 34*a*. Vaporized hydrocarbon feed supplied from a hydrocarbon feed line and perhaps inert purge gas, such as steam or dry gas, are fed from feed pipe 36*a* to the header 34*a*. The header 34*a* has an array 38*a* of nozzles 40, 42 extending from the header. A first side of the header 34*a* has a flat face 44 and the nozzles 40, 42 extend from the flat face. The nozzles 40, 42 are tubes such as cylinders with outlets 40*a*, 42*a* disposed in the riser 20 and inlets 40*b*, 42*b* disposed in the header 34*a*. Indeed, more than half and preferably more than two-thirds of the length of the nozzles 40, 42 may be disposed in an interior of the header with a remaining length extending from the header toward an interior of the riser 20. A first frustoconical shield 46*a* with an abrasion resistant lining 47*a* may be secured to the flat face 44 of the header 34*a* such as by welding to shield the header 34*a* from abrasive, upwardly flowing catalyst. The first shield 46*a* may have an L-shaped flange at its bottom end. The nozzles 40, 42 extend into the shield through openings 48 in the shield 46a and lining 47a. The fit between the nozzles 40, 42 and the openings 48 in the shield 46 should be snug to avoid infiltration by catalyst.

An imaginary line "A" extends between an innermost intersection 52 of a top of the bulge 26 and the wall 22 of the riser 12 just above the bulge 26 and an innermost intersection 54 of a bottom of the bulge 26 and the wall 22 just below the bulge 26 at the same radial position as innermost intersection 52. In other words intersection 52 is defined by the inner vertex defined between the upper diagonal side 32 and the wall 22, and intersection 54 is defined by the inner vertex defined between lower diagonal side 28 and the wall 22 at the same radial position as intersection 52. Because the refractory linings 22a, 32a, 28a are disposed inwardly of the walls 22, 32, 28, respectively, the intersections 52, 54 are defined by the inner surface of the refractory linings. Imaginary line "A" may have a slope that is equal to the slope of the swage section 12. To protect the nozzles 40, 42 from erosion by abrasive upwardly flowing catalyst, the outlets 40a, 42a which are disposed inwardly of the flat face 44 of the header 34a, do not extend inwardly of the imaginary line "A." The imaginary line "A" is contained in an inner surface of the shield 46a with lining 47a. Consequently, the outlets 40a, 42a do not protrude inwardly in the riser 20 beyond the first shield 46a with lining 47a. The upright side 30 may be parallel to imaginary line "A".

The distributor 10a is disposed in the swaged section 12. The swage section 12 has an increasing diameter from bottom to top which defines a slope. The distributor 10a defines a longitudinal axis "B" extending through the feed pipe 36a which may be parallel to the nozzles 40, 42. The longitudinal axis "B" may be perpendicular to imaginary line "A" and upright side 30. The longitudinal axis "B" may be angled from a horizontal line by angle α which is equal to the slope of the wall 22 in the swage section 12 from vertical.

A first row of nozzles 40 are disposed above a second row of nozzles 42 in the header 34a. In an aspect, the nozzles 40, 42 are radially oriented to direct gaseous feed toward a center of the riser 20.

In operation, a hydrocarbon feed line feeds vaporized hydrocarbon feed to the feed pipe 36a. The feed pipe feeds the tubular header 34a. The tubular header 34a is filled with the gaseous hydrocarbon feed which sprays the gaseous hydrocarbon feed through the array of nozzles 40, 42, which may comprise two rows of nozzles 40, 42, into the riser 20. The feed may be accompanied with an inert purge gas, such as steam or dry gas, to prevent catalyst from infiltrating the distributor if flow from the hydrocarbon feed line is interrupted. The distributor 10a sprays hydrocarbon feed from behind the imaginary line "A". The frustoconical shield 46a shields the distributor 10a from catalyst flowing upwardly in the riser.

The distributor arrangement 10 may comprise a second distributor 10b disposed below the first distributor 10a. The second distributor 10b is in all respects the same as the first distributor 10a, except it may be rotated out of phase with the first distributor 10a by 90 degrees in the horizontal plane and may have a slightly smaller diameter due to its location lower in the swaged section 12 and the recess 24 of smaller diameter. The second distributor 10b comprises a tubular header 34b with an array 38b of nozzles 40, 42 extending from a flat face 44. A second frustoconical shield 46b with an abrasion resistant lining 47b may be secured to the flat face 44 of the header 34b such as by welding to shield the header 34b from abrasive, upwardly flowing catalyst. A top edge of second shield 46b is slidably engaged with an L-shaped flange on the bottom edge of the first shield 46a. Shields 46a and 46b with respective linings 47a, 47b are independently secured to allow for independent thermal expansion. The imaginary line "A" is contained in an inner surface of the shield 46b with lining 47b. The nozzles 40, 42 extend through openings 48 in but not beyond the second shield 46b with lining 47b and imaginary line "A".

The distributor arrangement 10 may also comprise a third distributor 10c disposed opposite to the first distributor 10a. The third distributor may be disposed at the same height as the first distributor 10a. The third distributor 10c is in all respects the same as the first distributor 10a, except it is rotated out of phase with the first distributor 10a by 180 degrees in the horizontal plane. The third distributor 10c comprises a tubular header 34c with an array of 38c nozzles 40, 42 extending from a flat face 44. A third frustoconical shield 46c with an abrasion resistant lining 47c may be secured to the flat face 44 of the header 34c such as by welding to shield the header 34c from abrasive, upwardly flowing catalyst. The third shield 46c may also have an L-shaped flange at its bottom end. A top edge of second shield 46b is slidably engaged with the L-shaped flange on the bottom edge of the third shield 46c. The nozzles 40, 42 extend into the shield 46c through openings 48 in the shield 46c and lining 47c. The fit between the nozzles 40, 42 and the openings 48 in the shield 46c should be snug to avoid infiltration by catalyst. The nozzles 40, 42 extend through openings in but not beyond the second shield 46c with lining 47c and imaginary line "A'". Imaginary line "A'" has the same definition as imaginary line "A" except it is drawn on the opposite side of the riser 20 in FIG. 2 for illustrative purposes.

The distributor arrangement 10 may also comprise a fourth distributor 10d disposed opposite to the second distributor 10b and below the third distributor 10c, but it cannot be viewed in FIG. 2.

Figure 3:
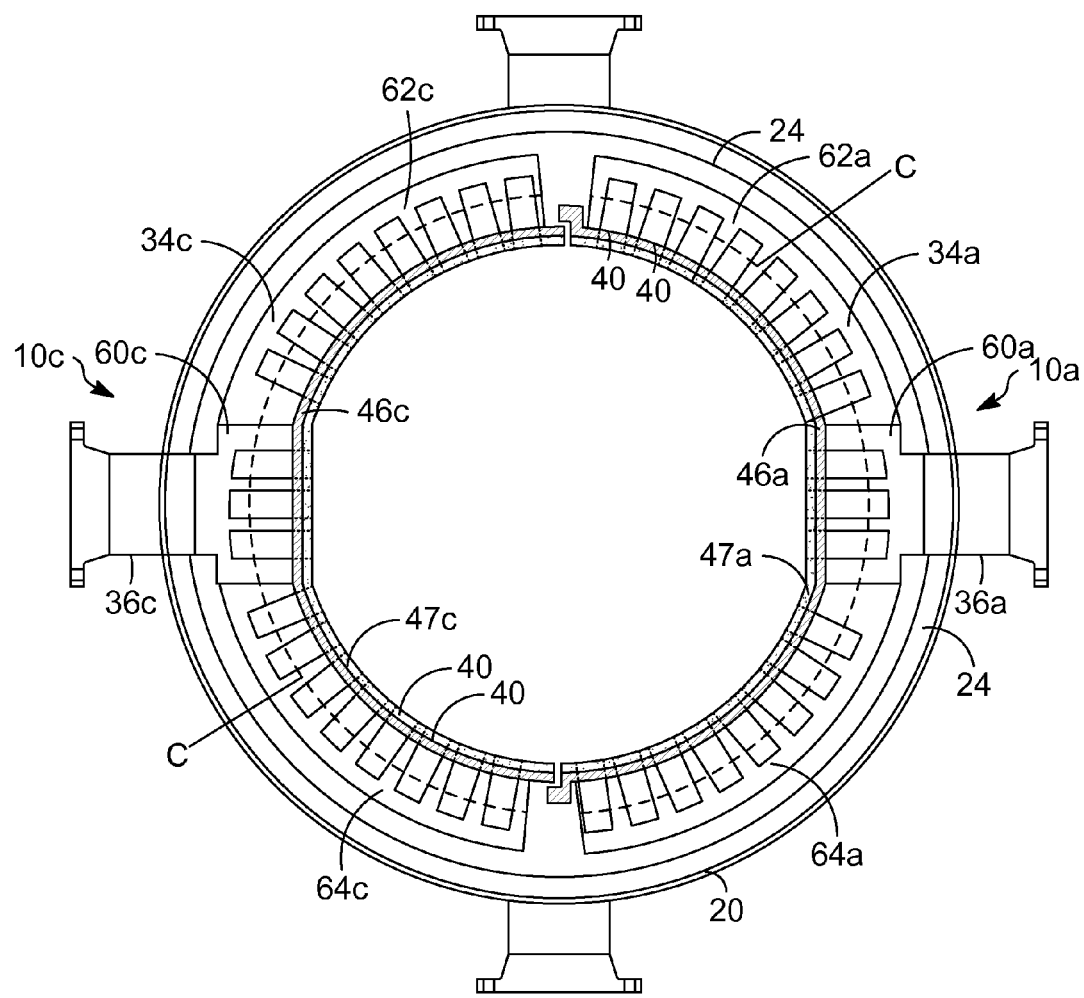
FIG. 3 is a cross-sectional view taken along segment 3-3 in FIG. 2.

FIG. 3 is a cross-sectional view of FIG. 2 taken at segment 3-3 showing the first and third distributors 10a and 10c. The header 34a of the first distributor 10a has a round longitudinal axis "C". By round longitudinal axis, it is meant that the axis can be circular or arcuate with circular being preferred. The header 34a of the first distributor 10a extends only partially around the riser 20 in the recess 24 which is shown to be an annular groove. The hydrocarbon feed pipe 36a connects to a middle 60a of the header 34a and the header has two rounded arms 62a and 64a extending from each side of the middle 60a. Only the top row of nozzles 40 can be seen in FIG. 3. The frustoconical shield 46a with liner 47a extends only partially around the riser 20 nearly coextensive with the first distributor 10a. Ends of the shield 46a may be equipped with L-shaped flanges.

The header 34c of the third distributor 10c also has a round longitudinal axis "C". The header 34c of the third distributor 10c extends only partially around the riser 20 in the recess 24 and opposes the header 34a of the first distributor 10a. The hydrocarbon feed pipe 36c connects to a middle 60c of the header 34c and the header has two rounded arms 62c and 64c extending from each side of the middle 60c. The arm 62a of the header 34a of the first distributor 10a has an end adjacent to an end of the arm 62c of the header 34c of the third distributor 10c, and the arm 64a of the header 34a of the first distributor 10a has an end adjacent to an end of the arm 64c of the header 34c of the third distributor 10c. The frustoconical shield 46c and liner 47c extends only partially around the riser 20 nearly coextensive with the third distributor 10c. Ends of the shield 46c may slidably engage L-shaped flanges of shield 46a to allow for thermal expansion.

Figure 4:
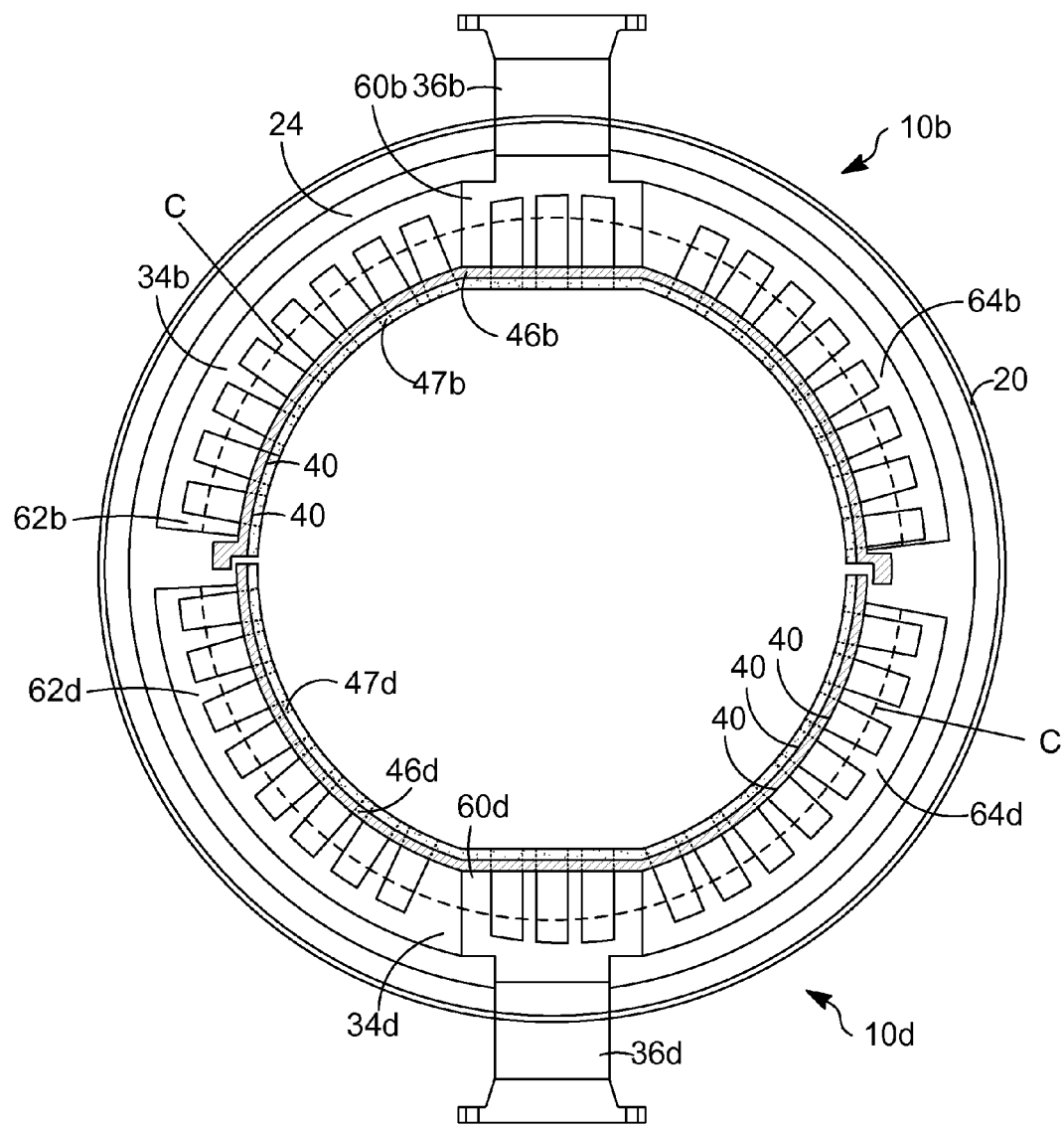
FIG. 4 is a cross-sectional view taken along arc 4-4 in FIG. 2.

FIG. 4 is a cross-sectional view of FIG. 2 taken at arc 4-4 showing the second and fourth distributors 10b and 10d. The header 34b of the third distributor 10b has a round longitudinal axis "C". The header 34b of the second distributor 10b extends only partially around the riser 20 in the recess 24 which is shown to be an annular groove. The hydrocarbon feed pipe 36b connects to a middle 60b of the header 34b and the header 34b has two rounded arms 62b and 64b extending from each side of the middle 60b. Only the top row of nozzles 40 can be seen in FIG. 4. The frustoconical shield 46b and liner 47b extends only partially around the riser 20 nearly coextensive with the second distributor 10b. Ends of the shield 46b may be equipped with L-shaped flanges.

The fourth distributor 10d is first illustrated in FIG. 4. A header 34d of the fourth distributor 10d has a round longitudinal axis "C". The header 34d of the fourth distributor 10d extends only partially around the riser 20 in the recess 24 and opposes the header 34b of the second distributor 10b. A hydrocarbon feed pipe 36d connects to a middle 60d of the header 34d and the header has two rounded arms 62d and 64d extending from each side of the middle 60d. The arm 62b of the header 34b of the second distributor 10b has an end adjacent to and end of the arm 62d of the header 34d of the fourth distributor 10d, and the arm 64b of the header 34b of the second distributor 10b has an end adjacent to an end of the arm 64d of the header 34d of the fourth distributor 10d. The frustoconical shield 46d and liner 47d extends only partially around the riser 20 nearly coextensive with the fourth distributor 10d. Ends of the shield 46d may slidably engage L-shaped flanges of shield 46b to allow for thermal expansion.

Figure 5:
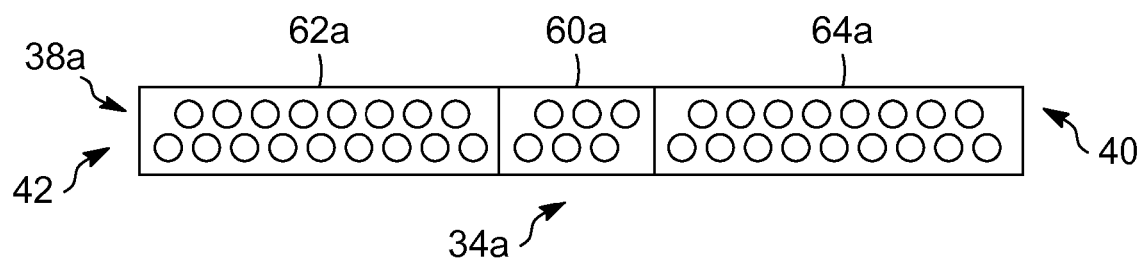
FIG. 5 is an elevational view of a header in the distributor arrangement.

FIG. 5 is an elevational view of the header 34a of the distributor 10a. The header 34a includes the middle section 60a flanked by arms 62a and 64a. The two rows of nozzles 40, 42 are grouped among the middle 60a and the arms 62a, 64a of the header 34a. The nozzles 40, 42 may be disposed in an array 38a having a triangular pitch. The other headers 34b, 34c and 34d may have a similar configuration. The two higher headers 34a and 34c may have a greater circumferences and consequently more nozzles 40, 42 than the two lower headers 34b, 34d because the diameter of the swage section 12 increases with height.

Greater or less distributors 10a-10d are contemplated. In other words, more or less distributors may be provided at a given height in the riser 20 and more or less levels of distributors are contemplated.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydrocarbon feed distributor for fluid catalytic cracking apparatus comprising:
   a hydrocarbon feed pipe;
   a tubular header connective with said hydrocarbon feed pipe, said header having a round longitudinal axis, said hydrocarbon feed pipe connecting to a middle of said header and said header has two rounded arms extending from said middle;
   an array of nozzles extending from said header and in communication with said hydrocarbon feed pipe.

2. The hydrocarbon feed distributor of claim 1, wherein said hydrocarbon feed pipe is the only feed pipe connective with said header.

3. The hydrocarbon feed distributor of claim 1, wherein said array of nozzles defines two rows of nozzles.

4. The hydrocarbon feed distributor of claim 1, wherein nozzles extend into said header.

5. The hydrocarbon feed distributor of claim 1, wherein a first side of said header has a flat face.

6. The hydrocarbon feed distributor of claim 5, wherein said nozzles extend from said flat face.

7. The hydrocarbon feed distributor of claim 1, wherein said nozzles extend away from said hydrocarbon feed pipe.

8. The hydrocarbon feed distributor of claim 1, wherein a shield is secured to said header and said nozzles extend into said shield.

9. A fluid catalytic cracking apparatus comprising:
   a riser having a wall;
   a recess in said wall surrounding said riser; and
   a feed distributor disposed in said recess, said feed distributor comprising:
   a tubular header connective with a hydrocarbon feed pipe, said header having a round longitudinal axis, an array of nozzles extending from said header and a first side of said header having a flat face and said nozzles extending from said flat face.

10. The fluid catalytic cracking apparatus of claim 9, wherein said recess is defined by a convex bulge in said wall.

11. The fluid catalytic cracking apparatus of claim 9, wherein said hydrocarbon feed pipe is the only feed pipe connective with said header.

12. The fluid catalytic cracking apparatus of claim 9, wherein said array of nozzles defines two rows of nozzles.

13. The fluid catalytic cracking apparatus of claim 9, wherein a shield is secured to said header and said nozzles extend into said shield.

14. The fluid catalytic cracking apparatus of claim 9, wherein said nozzles do not protrude beyond an imaginary line extending between a top innermost intersection of a bulge defining said recess and said wall and a bottom innermost intersection of said bulge defining said recess and said wall at the same radial position as the top innermost intersection.

15. The fluid catalytic cracking apparatus of claim 14, wherein a shield is secured to said header and said imaginary line is contained in an inner surface of said shield.

16. A fluid catalytic cracking apparatus comprising:
   a riser having a wall;
   a recess in said wall surrounding said riser;
   a feed distributor disposed in said recess, said distributor comprising a tubular header having a round longitudinal axis, and an array of nozzles extending from said header; and
   a shield secured to said header and said nozzles extending into said shield.

17. The fluid catalytic cracking apparatus of claim 16, wherein said header extends only partially around said riser.

* * * * *